US006785538B2

(12) United States Patent
Nihei

(10) Patent No.: US 6,785,538 B2
(45) Date of Patent: Aug. 31, 2004

(54) COMMUNICATION SYSTEM, COMMUNICATION METHOD, AND STORAGE MEDIUM STORING COMMUNICATION PROGRAM FOR MOBILE DEVICE USERS

(75) Inventor: Katsumi Nihei, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 09/815,103

(22) Filed: Mar. 22, 2001

(65) Prior Publication Data

US 2001/0025248 A1 Sep. 27, 2001

(30) Foreign Application Priority Data

Mar. 23, 2000 (JP) ........................................ 2000-082415

(51) Int. Cl.[7] ............................................ H04M 11/00
(52) U.S. Cl. ................................ 455/414.1; 455/414.2; 455/414.3; 455/456.1; 455/412.2; 455/456.3
(58) Field of Search ........................ 455/414.1, 414.2, 455/414.3, 456.1, 456.3, 404.2, 412.2, 456.2, 456.5, 465.6; 705/1

(56) References Cited

U.S. PATENT DOCUMENTS

2001/0031642 A1 * 10/2001 Matsuyama ................. 455/414
2002/0049053 A1 * 4/2002 Nomura et al. ............. 455/426

FOREIGN PATENT DOCUMENTS

| DE | 19638515 | 2/1998 | ............ G08G/1/09 |
| EP | 986-273 A | 3/2000 | ............ H04Q/7/22 |
| WO | WO 9604633 | 2/1996 | ............ H04H/1/00 |
| WO | WO-9741654 | 6/1997 | ............ H04H/1/00 |

* cited by examiner

Primary Examiner—Fan Tsang
Assistant Examiner—Ovidio Escalante
(74) Attorney, Agent, or Firm—Scully, Scott, Murphy & Presser

(57) ABSTRACT

A communication system and a method of communication for a user of a portable information terminal are provide which are capable of automatically acquiring information of an occasion that the user desires while the portable information terminal is being used by the user and of carrying out communication among users having best matching conditions in terms of time (T), place (P), and individual preference according to occasion (O) (may be referred to as an occasion) of the user.

The communication system is made up of portable information terminals and a center being communicated via a wireless communication unit. The center has a spot information database and a user TPO (Time, Place, and Occasion) database. Element information is extracted by the center from a message received from the user. By learning a desired occasion of the user, a user TPO database is produced. Based on the TPO database, spot information and another user information having best matching conditions in terms of time (T), place (P), and desired occasion (O) are selected and transmitted to the user.

33 Claims, 6 Drawing Sheets

FIG.2

| message type (200) | user ID (210) | place information (220) | message content (230) |
|---|---|---|---|

FIG.3A

| transmission of place information | 090-1234 -5678 | latitude="35.38.48", longitude="139.45.4" | |
|---|---|---|---|
| message type (200a) | user ID (210a) | place information (220a) | message content (230a) |

FIG.3B

| transmission of user message | 090-1234 -5678 | latitude="35.38.48", longitude="139.45.4" | Shall we have coffee? |
|---|---|---|---|
| message type (200b) | user ID (210b) | place information (220b) | message content (230b) |

FIG.3C

| transmission of request for spot information | 090-1234 -5678 | latitude="35.38.48", longitude="139.45.4" | |
|---|---|---|---|
| message type (200c) | user ID (210c) | place information (220c) | message content (230c) |

FIG.4A

| receiving of user message | 090-8765 -4321 | latitude="35.38.48", longitude="139.45.4" | "I can meet you." |
|---|---|---|---|
| message type (200d) | user ID (210d) | place information (220d) | message content (230d) |

FIG.4B

| receiving of spot information | 090-1234 -5678 | latitude="35.38.48", longitude="139.45.4" |
|---|---|---|
| message type (200d) | user ID (200d) | place information (200d) |

| spot ID="C15",spot name="Burgar World ODAIBA" content="[Burgar World ODAIBA]Special burgar is..." |
|---|
| message content (200d) |

FIG.5

| spot ID | spot name | place information | description content |
|---|---|---|---|
| 300 | 310 | 320 | 330 |

FIG.6A

| spot ID | spot name | place information | description content |
|---|---|---|---|
| 026 | ODAIBA | latitude="35.38.48", longitude="139.45.4" | "In ODAIBA, there are sandy beaches artificially constructed, and in summer, many..." |

| spot ID | spot name | place information | description content |
|---|---|---|---|
| C15 | Burgar World | latitude="35.38.47", longitude="139.45.3" | "Burgar World provides burgar at a bargain price..." |

| user ID | place information | profile information | operational information | movement information |
|---|---|---|---|---|

*400 / 410 / 420 / 430 / 440*

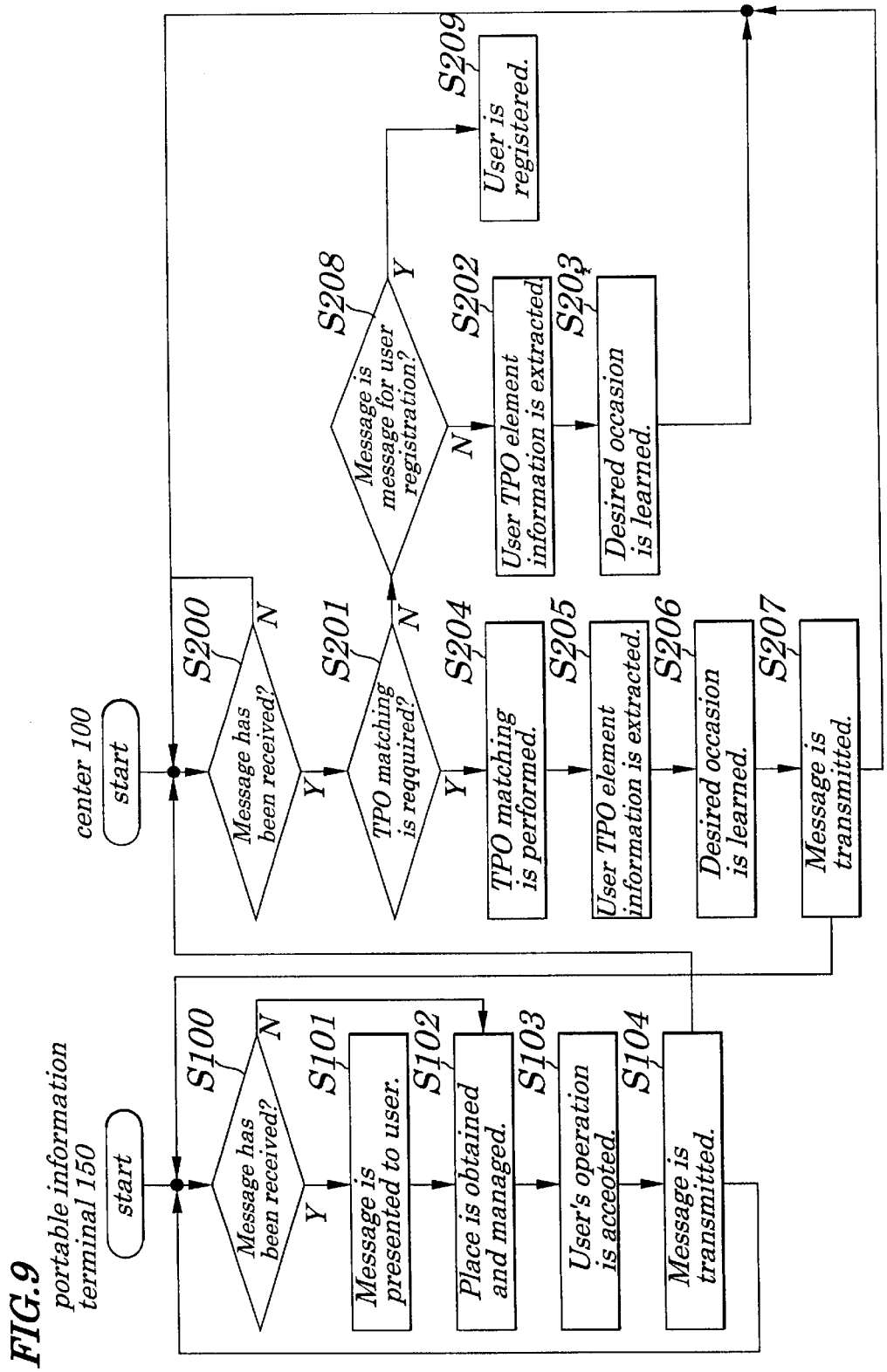

COMMUNICATION SYSTEM, COMMUNICATION METHOD, AND STORAGE MEDIUM STORING COMMUNICATION PROGRAM FOR MOBILE DEVICE USERS

BACKGROUND OF THE INVENTION

1. Field of the Invention

The present invention relates to a communication system for mobile device users, a communication method for mobile device users, a communication business method for mobile device users, a communication program, a storage medium storing a communication program which causes processing to be performed by computers making up a center being communicated with a portable information terminal through a wireless communication unit, a portable information terminal for communication with a center via a wireless communication unit, and a communication business center apparatus for mobile device users being communicated with a portable information terminal via a wireless communication unit.

The present application claims priority of Japanese Patent Application No. 2000-082415 filed on Mar. 23, 2000, which is hereby incorporated by reference.

2. Description of the Related Art

In a conventional communication system and communication method which provide an occasion matching service, such as an acquainting occasion service, to a user of a mobile device, the user stores, in advance, attributes including an age, a gender or a like of the user and attributes including a request for a type of occasion matching service in a computer of a center and transmits his/her present place to the computer of the center from a portable information terminal that the user carries using a portable cellular phone or a like as wireless communication unit and the computer of the center retrieves information about a place in which another user exists in close proximity to the above user and transmits a retrieved result to the portable information terminal of the user.

Moreover, another method is disclosed in which the user of the portable information terminal stores a message in the computer of the center using the portable information terminal and only other users existing in close proximity to the above user are allowed to browse the message.

However, in the above conventional communication system and communication method for the mobile device user, a match is achieved between users not only by using information about the place of the user but also by using his/her attributes including a age, a gender, or the like which have been stored in advance as information about an occasion, that is, an individual preference according to an occasion, that the user desires, in the computer of the center. Therefore, the conventional system and method have a problem in that the information required for occasion matching is made fixed, making it impossible to dynamically change contents of the occasion that the user desires with change of time or place. That is, the user, at present, may not have an interest in what the user had in the past, which means that the information about a kind of the occasion matching changes with time.

In the conventional communication system and method for the mobile device users, to keep up with such changes of the occasion matching desired by the user, re-storing of information about the occasion desired newly and presently by the user in the computer of the center is required. However, this becomes burdensome to the user because the user has to store again and again changed desires in the computer of the center.

Though the re-storing of the age, the gender, or the like of the user is easy, the re-storing of information about what kind of acquainting occasion the user desires newly or what kind of the spot the user comes to like, as attributes, in the computer of the center requires much time and labor. The re-storing also becomes burdensome to the user if the user has to store the information every time the occasion desired by the user changes. It is essential to take some of the burden off of the user using such the communication system and method of the portable information terminal.

SUMMARY OF THE INVENTION

In view of the above, it is an object of the present invention to provide a communication system, a communication method, a communication business method, a portable information terminal, a communication business center apparatus, a communication program, and a storage medium storing the communication program for mobile device users which are capable of automatically acquiring an occasion matching that the user desires while the portable information terminal is in an operating state and of implementing, based on a most up-to-date information, successful communication between users existing in proximity to each other and having similar kinds of the desired occasion matching and achieving increased numbers of successful occasion matching.

According to a first aspect of the present invention, there is provided a communication system for mobile device users including:

a portable information terminal;

a center; and wherein the portable information terminal and the center are communicated with each other through a wireless communication unit; and wherein the portable information terminal has:

a place information managing unit used to acquire information about a place where the portable information terminal exists and to manage the acquired place information; and a message managing unit used to manage the place information, an identification to identify a user and an operational behavior of the user in a form of a message and to transmit the message to the center and used to provide a message fed from the center to the user;

wherein the center has:

a message controlling unit used to transmit the message to the portable information terminal and to receive the message from the portable information terminal;

a user TPO element information extracting unit used to extract element information made up of information about a present time (T), a present place (P), and an individual preference according to a present Occasion (O) of the user from the message fed from the portable information terminal.

a spot information database used to store spot information about a restaurant and/or a sight-seeing resort made up of information about spots and explanatory contents of the spots;

an occasion learning unit used to learn a desired individual preference according to an occasion from the user TPO element information and the spot information database and to produce user TPO data made up of static information containing the identification, age, gender of the user and of dynamic information about when and where the user has visited and about what kind of spot or information the user has an interest in;

a user TPO database used to store a user TPO data produced for each user by the occasion learning unit; and a TPO matching unit used to select spot information, when the message fed from the user includes a request for spot information, by achieving a match between spot information and the user TPO data of the user having transmitted the request message contained in the user TPO database and to request the message controlling unit to transmit the selected spot information to the portable information terminal of the user having transmitted the message requesting spot information and, when the message fed from the user includes a request for transmission of the message from the user to another user, to select the other user by achieving a match between the user TPO data of the user having transmitted the message requesting for transmission of the message to the other user contained in the user TPO database and user TPO database of the other user and to request the message controlling unit to transmit the message fed from the user to a portable information terminal of the other user.

In the foregoing, a preferable mode is one wherein the message controlling unit in the center judges whether the user having transmitted the message to the center is a user who has been registered with the user TPO database from a user identification contained in the message fed from the portable information terminal and, as a result, if the user is not a registered user, controls the user TPO element information extracting unit so as not to perform extracting processes, the occasion learning unit so as not to perform the learning processes and the TPO matching unit so as not to perform matching processes.

Also, a preferable mode is one wherein the spot information database stores advertisement information to be added to spot information.

Also, a preferable mode is one wherein the TPO matching unit adds advertisement information selected by achieving a match between user TPO data of the selected other user and advertisement information contained in the spot information database, to the selected spot information or to a message to be transmitted to the selected other user.

Also, a preferable mode is one wherein a portable cellular phone or PHS (Personal Handy Phone System) is used as the wireless communication unit.

Also, a preferable mode is one wherein the message transmitted and received between the portable information terminal and the center is an electronic mail (E-mail).

According to a second aspect of the present invention, there is provided a communication method for mobile device users including:

a step of acquiring information about a place where a portable information terminal exists and of managing the place information in the portable information terminal;

a step of managing the place information, an identification to identify a user of the portable information terminal and an operational behavior of the user in a form of a message and transmitting the message from the portable information terminal to the center by a wireless communication unit and receiving the message fed from the center through the wireless communication unit and providing the message to the user, in the portable information terminal;

a step of managing the message to be transmitted and received between the portable information terminal and the center and of transmitting and receiving the message to and from the portable information terminal through the wireless communication unit, in the center;

a step of extracting a user TPO element information made up of information about a present time (T), a present place (P), and an individual preference according to an Occasion (O) of the user from the message fed to the center from the portable information terminal through the wireless communication unit, in the center;

a step of learning a desired individual preference according to a occasion of the user based on the user TPO element information and a spot information database storing spot information about a restaurant and/or a sight-seeing resort made up of information about the spots and explanatory contents of the spots and producing user TPO data made up of static information containing an identification, age, gender of the user and of dynamic information about when and where the user has visited and about what kind of spot or information the user has an interest in, in the center;

a step of selecting spot information, when the message fed from the user contains a request for spot information, by achieving a match between spot information and the user TPO data of the user having transmitted the message contained in the user TPO database and requesting the message controlling unit to transmit the selected spot information to the portable information terminal of the user having transmitted the message requesting for spot information and, when the message fed from the user contains a request for transmission of the message from the user to another user, selecting the other user by achieving a match between the user TPO data of the user having transmitted the message requesting for transmission of the message to the other user contained in the user TPO database and user TPO database of the other user and requesting the message controlling unit to transmit the message fed from the user to a portable information terminal of the other user, in the center.

In the foregoing, a preferable mode is one wherein the center judges whether the user having transmitted the message is a user who has been registered with the user TPO database, from a user identification contained in the message fed from the portable information terminal and, as a result, if the user is not a registered user, does not perform a step of extracting the user TPO element information, the step of learning the desired occasion of the user and of storing the user TPO data for each user into the user TPO database and the step of achieving a match among the user TPO data.

Also, a preferable mode is one wherein the spot information database contains advertisement information to be added to spot information.

Also, a preferable mode is one wherein, in the step, taken by the center, of identifying the user based on the user identification of the message fed from the portable information terminal through the wireless communication unit and of achieving a match between the user TPO data and the spot information database or the user TPO database, advertisement information selected by achieving a match between user TPO data of the selected other user and advertisement information contained in the spot information database is added to the selected spot information or to a message to be transmitted to the selected other user.

Also, a preferable mode is one wherein a portable cellular phone or PHS is used as the wireless communication unit.

Also, a preferable mode is one wherein the message transmitted and received between the portable information terminal and the center is an E-mail.

According to a third aspect of the present invention, there is provided a communication program which causes processing to be performed by computers making up a center being communicated with a portable information terminal through a wireless communication unit, wherein the portable information terminal includes:
- a place information managing unit used to acquire information about a place where the portable information terminal exists and to manage the acquired place information; and
- a message managing unit used to manage the place information, an identification to identify a user and an operational behavior of the user in a form of a message and to transmit the message to the center and used to provide a message fed from the center to the user; and wherein the center has:
- a spot information database used to store spot information about a restaurant and/or a sight-seeing resort made up of information about spots and explanatory contents of the spots;
- a user TPO database used to store user TPO data produced for each user; and wherein the processing includes:
- (a) a step of managing the message to be transmitted and received between the portable information terminal;
- (b) a step of extracting a user TPO element information made up of information about a present time (T), a present place (P), and an individual preference according to a present occasion (O) of the user from the message fed to the center from the portable information terminal;
- (c) a step of learning a desired individual preference according to an occasion of the user based on the user TPO element information and a spot information database storing spot information about a restaurant and/or a sight-seeing resort made up of information about the spots and explanatory contents of the spots and producing user TPO data made up of static information containing an identification, age, gender of the user and of dynamic information about when and where the user has visited and about what kind of spot or information the user has an interest in;
- (d) a step of selecting spot information, when the message fed from the user contains a request for spot information, by achieving a match between spot information and the user TPO data of the user having transmitted the message contained in the user TPO database and requesting that the selected spot information is transmitted by the message managing step to the portable information terminal of the user having transmitted the message requesting for spot information and, when the message fed from the user contains a request for transmission of the message from the user to another user, selecting the other user by achieving a match between the user TPO data of the user having transmitted the message requesting for transmission of the message to the other user contained in the user TPO database and user TPO database of the other user and requesting that the message fed from the user is transmitted by the message managing step to a portable information terminal of the other user.

According to a fourth aspect of the present invention, there is provided a communication business method including:
- a step of holding and managing, in a center communicating with a portable information terminal by a wireless communication unit, a spot information database used to store spot information about a restaurant and/or a sight-seeing resort made up of information about spots and explanatory contents of the spots and a user TPO database storing, for each user, user TPO data including information about a time, place, and individual preference according to occasion of the user;
- a step of extracting a user TPO element information made up of information about the time, the place, and the individual preference according to the occasion of the user from a message transmitted from the portable information terminal of the user and received by the center and obtaining the user TPO data containing a present place, and/or a desired individual preference according to a present occasion of the user and automatically updating the user TPO database; and
- a step of retrieving spot information from the spot information database, when the message received by the center contains a request for spot information, and obtaining spot information having best matching conditions in terms of time, place, and individual preference according to occasion of the user and providing the obtained spot information to the portable information terminal of the user.

According to a fifth aspect of the present invention, there is provided a communication business method including:
- a step of holding and managing, in a center communicating with a portable information terminal by a wireless communication unit, a user TPO database storing, for each user, user TPO data including information about a time, a place, and an individual preference according to occasion of a user;
- a step of extracting a user TPO element information made up of information about the time, the place, and the individual preference according to the occasion of the user from a message transmitted from the portable information terminal of the user and received by the center and obtaining the user TPO data containing a present place, and/or a desired individual preference according to a present occasion of the user and automatically updating the user TPO database;
- a step of setting a presence or an absence of a desire for acquainting an individual preference according to an occasion, as a profile of the user, in the user TPO database; and
- a step of retrieving the user TPO database, when the message received by the center contains a request for transmission of a message to another user or a request for acquainting an individual preference according to an occasion matching and selecting the other user having best matching conditions in terms of time, place, and individual preference according to occasion of the user and providing the message transmitted from the user to the portable information terminal of the selected other user.

In the foregoing, a preferable mode is one wherein the user TPO database holds, for each user, the identification of the user, profile information made up of information about personal information of the user, place information of the user, operational information of the user, and information about movement of the user.

Also, a preferable mode is one wherein the user TPO database and the profile information of the user stores personal information about a name, an address, a gender and an age, information about key words indicating information in which the user has an interest and information about a presence or absence of a desire for acquainting an individual preference according to an occasion and wherein the operational information of users contained in the user TPO database stores a spot identification of spot information requested by the user, a time when a request for the spot information was made and a place where a request for the spot information was made, and wherein the movement information of users contained in the user TPO database stores a spot identification of spot information related to spots where the user has visited and a time of the visit.

Also, a preferable mode is one that wherein includes a step of extracting the user TPO element information made up of the time (T), the place (P), and the individual preference according to the occasion (O) of the user, when a request for transmission of a message from the user to another user is contained in the message transmitted from the portable information terminal of the user and received by the center from the received message and obtaining user TPO data made up of information about a present place, and/or an individual preference according to a present occasion of the user from the extracted the user TPO element information and selecting the other user having best matching conditions in terms of time, place, and individual preference according to occasion of the user by retrieving information from the user TPO database and then transmitting message information fed from the user to a portable information terminal of the other user.

Also, a preferable mode is one wherein the other user having best matching conditions in terms of time, place, and individual preference according to occasion of the user having transmitted the request for transmission of the message is selected out of users for whom a desire for acquainting an individual preference according to an occasion has been pre-set in the user profile information contained in the user TPO database.

Also, a preferable mode is one wherein the spot information is made up of guidance information including, at least, one of a character string, image, voice, or moving picture.

Also, a preferable mode is one wherein advertisement information is added to spot information and/or message information to be transmitted from the center to the portable information terminal.

Also, a preferable mode is one wherein advertisement information having best matching conditions in terms of time, place, and occasion of users going to receive the spot information and/or message information.

Also, a preferable mode is one wherein place information of the portable information terminal is transmitted from the portable information terminal to the center and contents of the user TPO database are automatically updated based on the message transmitted from the portable information terminal.

Also, a preferable mode is one wherein, when place information is transmitted from the portable information terminal of the user and when the user stays for a predetermined period of time or more within a spot area, it is judged that the user has visited the spot and spot information for the user is retrieved from the spot information database and, based on information about the spot in which the user is judged to have visited, movement information of the user TPO database is updated.

According to a sixth aspect of the present invention, there is provided a portable information terminal for communication with a center via a wireless communication unit including:

a place information managing unit used to acquire information about a place where the portable information terminal exists and to manage the acquired place information;

a message managing unit used to manage the place information, an identification to identify a user and an operational behavior of the user in a form of a message and to transmit the message to the center and used to provide a message fed from the center to the user; and wherein a user TPO information made up of information about a time (T), a place (P), and an individual preference according to an occasion (O) is transmitted by the portable information terminal in a form of a message to the center and the center, based on the message transmitted from the portable information terminal, updates a user database and wherein the portable information terminal receives spot information having best matching conditions in terms of time, place, and individual preference according to occasion of the user and outputs.

According to a seventh aspect of the present invention, there is provided a portable information terminal for communication with a center via a wireless communication unit including:

a place information managing unit used to acquire information about a place where the portable information terminal exists and to manage the place information;

a message managing unit used to manage the place information, an identification to identify a user and an operational behavior of the user in a form of a message and to transmit the message to the center and used to provide a message fed from the center to the user; and wherein, based on the message transmitted from the portable information terminal of the user to the center, another user having best matching conditions in terms of time, place, and individual preference according to occasion of the user is selected by the center and a portable information terminal of the other user receives the message transmitted from the portable information terminal of the user to the center.

According to an eighth aspect of the present invention, there is provided a communication business center apparatus for mobile device users being communicated with a portable information terminal via a wireless communication unit including:

a spot information database used to store spot information about a restaurant and/or a sight-seeing resort made up of information about spots and explanatory contents of the spots;

a user TPO database used to store a user TPO data produced for each user including information about a time (T), a place (P), and an individual preference according to an occasion (O) of a user an extracting unit used to extract a user TPO element information made up of information about a present time (T), a present place (P), and a individual preference according to a present occasion (O) of the user from a message fed from the portable information terminal;

an automatically updating unit used to obtain user TPO data made up of information about the present place, and the individual preference according to the present occasion of the user from the extracted the user TPO element information and automatically updates the user TPO database;

a spot information obtaining unit used to obtain, when the received message contains a request for spot information, by retrieving a spot information database, spot information having best matching conditions in terms of time, place, and individual preference according to occasion of the user and to supply the spot information to the portable information terminal of the user.

In the foregoing, a preferable mode is one that wherein includes:

a selecting unit used to select another user having best matching conditions in terms of time, place, and individual preference according to occasion of the user having transmitted the message from the portable information terminal of the user containing a request for transmission of a message to the other user or a request for acquainting an individual preference according to an occasion by retrieving related information from the user TPO database and to transmit message information fed from the user to a portable information terminal of the other user.

Also, a preferable mode is one wherein the user TPO database holds, for each user, the identification of the user, profile information made up of information about personal information of the user, place information of the user, operational information of the user, and information about movement of the user.

Also, a preferable mode is one wherein the user TPO database and the profile information of the user stores personal information about a name, an address, a gender and an age, information about key words indicating information in which the user has an interest and information about a presence or absence of a desire for acquainting an individual preference according to an occasion and wherein the operational information of users contained in the user TPO database stores a spot identification of spot information requested by the user, a time when a request for the spot information was made and a place where a request for the spot information was made, and wherein the movement information of users contained in the user TPO database stores a spot identification of spot information related to spots where the user has visited and a time of the visit.

Also, a preferable mode is one wherein the spot information is made up of guidance information including, at least, one of a character string, image, voice, or moving picture.

Also, a preferable mode is one wherein advertisement information is added to spot information and/or message information to be transmitted from the center to the portable information terminal.

Also, a preferable mode is one wherein advertisement information having best matching conditions in terms of time, place, and occasion of users going to receive the spot information and/or message information.

Also, a preferable mode is one wherein place information of the portable information terminal is transmitted from the portable information terminal to the center and contents of the user TPO database are automatically updated based on the message transmitted from the portable information terminal.

With the above configurations, since individual preference information that the user desires can be automatically obtained while the portable information terminal is being used by the user and, based on most up-to-date desired individual preference information, the message can be transmitted from the user to another selected user having best matching conditions in terms of the present time, the present place, and the desired individual preference according to the present occasion of the user, it is expected that a rate of reply from the other users having the best matching conditions in terms of time, place, and individual preference according to occasion is made higher and, since a possibility of actually meeting with each other increases, occasion matching among mobile users provided by the communication system of the present invention can be improved.

BRIEF DESCRIPTION OF THE DRAWINGS

The above and other objects, advantages and features of the present invention will be more apparent from the following description taken in conjunction with the accompanying drawings in which:

FIG. 2 is a diagram showing one example of a configuration of a message employed in the communication system according to the embodiment of the present invention;

FIGS. 3A, 3B and 3C are diagrams showing examples of a transmitting message employed in the communication system according to the embodiment of the present invention;

FIGS. 4A and 4B are diagrams showing examples of a receiving message employed in the communication system according to the embodiment of the present invention;

FIG. 5 is a diagram showing a configuration of spot information employed in the communication system according to the embodiment of the present invention;

FIGS. 6A and 6B are also diagrams showing examples of the spot information employed in the communication system according to the embodiment of the present invention;

FIG. 7 is a diagram showing a configuration of user TPO (Time, Place, and individual preference according to Occasion) data employed in the communication system according to the embodiment of the present invention;

FIG. 9 is a diagram illustrating operations of the communication system according to the embodiment of the present invention.

DETAILED DESCRIPTION OF THE PREFERRED EMBODIMENTS

Best modes of carrying out the present invention will be described in further detail using various embodiments with reference to the accompanying drawings.

Embodiment

Figure 1:
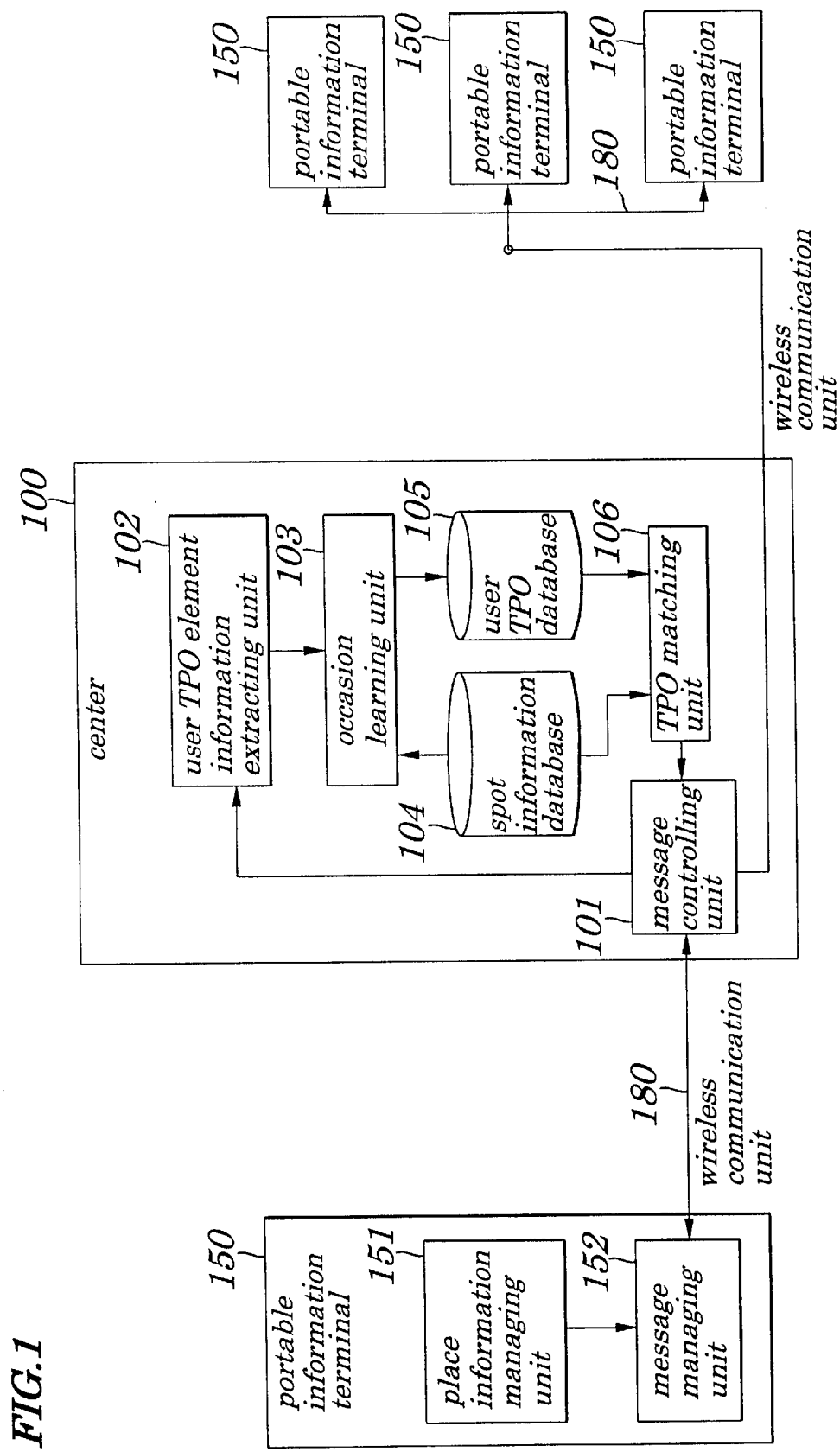
FIG. 1 is a schematic block diagram showing configurations of a communication system according to an embodiment of the present invention.

A communication system of an embodiment of the present invention, as shown in FIG. 1, includes portable information terminals 150 that can be communicated with each other by radio and a center 100 which is communicated with the portable information terminals 1 (mobile terminals) 50, 150, . . . via a wireless communication unit 180, 180, . . . . Each portable information terminal 150 has a place information managing unit 151 used to acquire and manage information about a place in which the portable information terminal 150 exists and a message managing unit 152 used to manage an identification for identification of a user and a message represented by an operational action or behavior of the user and to transmit the information to the center 100 and to supply a message fed from the center 100 to the user.

The center 100 includes a message controlling unit 101 used to transmit a message to and to receive a message from the portable information terminal 150, a user TPO element information extracting unit 102 used to extract element information made up of a present time (T), a present place (P) and an individual preference according to a present occasion (O) ("Individual preference according to occasion" hereinafter may be referred simply to as occasion) of each user from the message fed from the portable information terminal 150, a spot information database 104 storing spot information about a restaurant, sight-seeing resort or a like made up of information about places of a spot and explanatory contents of the spot, an occasion learning unit 103 used to learn an occasion desired by the user based on information fed from the user TPO element information extracting unit 102 and the spot information database 104 and to produce user TPO data containing "static" information about an ID (Identification), age, gender, and a like of the user and "dynamic" information about when and where the user has visited and what kind of spot or what kind of information the user has an interest in, a user TPO database 105 storing the user TPO data prepared for each user that has been produced by the occasion learning unit 103 and a TPO matching unit 106 used to select, if a request for information about the spot is contained in the message transmitted and received by the center 100, spot information held by the center 100 by achieving a match between request content of the spot information and the user TPO data stored in the user TPO database 105 and to request the message controlling unit 101 to transmit selected spot information to the user who has transmitted the message requesting for the information about the spot and to select other users by achieving a match between the user TPO data contained in the user TPO database 105 of the user who has transmitted the above message and user TPO data of another user and to request the message controlling unit 101 to transmit a message to a portable information terminal 150 of the selected other user.

Thus, the user can obtain, through the portable information terminal 150, spot information with considerations given to the time, place, and desired occasion on a user side and the center 100 can automatically learn the occasion desired by the user based on the information about the user's manipulation, that is, the user's operations or behaviors and can transmit the related message to another user having information about a time, place, and desired occasion being similar to those of the user, which enables increased numbers of successful occasion matching.

The message controlling unit 101 of the center 100 judges, from a user ID contained in the received message, whether the user having transmitted the message is an authorized user who has been registered with the user TPO database 105 and does not perform any processing if the user is not authorized. This enables service to be provided only to a specified member and can prevent a message from being transmitted to a user who does not want to receive, thus avoiding transmission of unwanted messages.

Moreover, the spot information database 104 may have advertisement information to be added to the spot information. This enables an income by providing advertisements.

The TPO matching unit 106 may add advertisement information selected by achieving the match between TPO information held by the user going to receive the spot information and advertisement information stored in the spot information database 104, to the selected spot information and/or to a message to be transmitted to the selected user. This enables transmission of the message containing the advertisement being best matched to the TPO conditions of the user going to receive the message, thus improving advertisement effects.

In the embodiment, a portable cellular phone is used as a means for the radio communication. This allows an already-existing communication infrastructure to be used.

Also, the message described above is an E-mail (Electronic mail). This allows a system combined with other existing systems to be easily constructed.

Also, functions of each of units making up the center 100 can be implemented by executing related program by a computer of the center 100. These units are (a) the message controlling unit 101 used to transmit a message to and receive a message from the portable information terminal 150, (b) the user TPO element information extracting unit 102 used to extract element information made up of a present time (T), a present place (P) and a present desired occasion (O) of each user from the message fed from the portable information terminal 150, (c) the occasion learning unit 103 used to learn the occasion desired by the user based on information fed from the user TPO element information extracting unit 102 and the spot information database 104 and to produce user TPO data containing "static" information about an ID, age, gender and a like of the user and "dynamic" information about when and where the user has visited and what kind of spot or what kind of information the user has an interest in, and (d) the TPO matching unit 106 used to select, if a request for information about a spot is contained in the message transmitted and received by the center 100, spot information by achieving a match between the request for the spot information and the user TPO data stored in the user TPO database 105 and to request the message controlling unit 101 to transmit the selected spot information to the user who has transmitted the message requesting for the information about the spot and to select another user by achieving a match between the user TPO data contained in the user TPO database 105 of the user who has transmitted the above message and user TPO data of the other user and to request the message controlling unit 101 to transmit a message to a portable information terminal 150 of the selected other user. In this case, the present invention can be carried out by mechanically reading this program from a storage medium including FD (Floppy Disk), CD-ROM, DVD (Digital Versatile Disk), HDD, MT (Magnetic) tape, and semiconductor memory or by downloading the program from a server through a communication medium to a computer to be installed and then by executing this program.

By applying the present invention to a communication business model, it is made possible to provide spot information having best matching conditions in terms of time, place, and occasion to a member of users having a mobile terminal, that is the portable information terminal 150 and to transmit a message to another user having best matching conditions in terms of time, place, and desired occasion of the user, thus successfully increased occasion matching among members.

Operations of the communication system and method for the mobile user of the present invention will be described in detail by referring to Figures.

FIG. 1 is a schematic block diagram showing configurations of the communication system of the embodiment of the present invention. As shown in FIG. 1, the portable information terminal 150 is communicated with the center 100 via a wireless communication unit 180. The portable information terminal 150 is made up of an information processing device carried by its user including a notebook PC, PDA (Personal Digital Assistance) or a like. The portable information terminal 150 includes the place information managing unit 151 and the message managing unit 152.

The place information managing unit 151 acquires information about a place where the portable information terminal 150 exists and manages the acquired information about the place. The place information managing unit 151 is made up of, for example, a GPS (Global Positioning System) or a like, which is adapted to obtain the information about the place in which the portable information terminal 150 exists.

The message managing unit 152 is adapted to manage a message and to transmit the message to the center 100 and to receive a message from the center 100 and to provide the message to the user.

As shown in FIG. 2, a message to be transmitted or received by the communication system of the embodiment is made up of a message type 200, a user ID 210, place information 220 acquired by the place information managing unit 151 and a message content 230. The message type 200 describes a method for processing a message to be transmitted and received.

FIGS. 3A, 3B, and 3C are diagrams showing examples of the message type 200 which is transmitted from the user. The message type 200a shown in FIG. 3A is an example in which place information only is transmitted from the user to the center 100. The message type 200b shown in FIG. 3B is an example in which a message is transmitted to another user. The message type 200c shown in FIG. 3C is an example in which spot information is requested by the user. As another message type, for example, a message to be used for registration of a user may be used.

FIGS. 4A and 4B are diagrams showing examples of the message type 200 to be received. The message type 200d shown in FIG. 4A is an example in which a message that has been transmitted from another user is received. The message type 200e shown in FIG. 4B is an example in which spot information is received.

The user ID 210 (FIG. 2) describes a value that identifies a user uniquely. If, for example, a portable cellular phone is used as the wireless communication unit 180, a portable cellular phone number of the user is used as the user ID 210. In FIGS. 3A, 3B, and 3C, user IDs 210a, 210b, and 210c are described by using portable cellular phone numbers of the user transmitting a message. In FIG. 4A, the user IDs 210d is described, as the example, also using portable cellular phone numbers of the user who has transmitted this message. However, in order to protect privacy of the user, the description of the user ID may be omitted. The user ID 210e shown in FIG. 4B, because the message type 200e is the spot information that has been received by the user and transmitted from the center 100, is always the user ID that has received the spot information. In FIGS. 4A and 4B, the place information 220 (place information 200d and place information 200e respectively) describes a place where the portable information terminal 150 exists. The place information 220 may be described using, for example, a latitude and a longitude. In FIGS. 3A, 3B, and 3C, place information 220a, 220b and 220c are examples in which the place in which the portable information terminal 150 transmitting the message to the center 100 exists is described by using the latitude and longitude.

In FIGS. 4A and 4b, place information 220d and place information 200e are also examples in which a place where the user having transmitted the message exists is described by using the latitude and longitude. In the message content 230 (FIG. 2), contents of the message are described in a form of a text file, image, voice, and moving picture or a like. In FIGS. 3A, 3B, and 3C, the message content 230a (FIG. 3A) is an example of a case in which only the place information obtained from a value of the message type 200 is transmitted and nothing is described as its message content. The message content 230b (FIG. 3B) is an example of a message transmitted to another user based on the information about a value of the message type 200b (FIG. 3B) and the content of its message to be transmitted is described in a form of a text file. The message content 230c (FIG. 3C) is an example of a case in which spot information is requested by the user based on the information about a value of the message type 200c (FIG. 3B) and nothing is described as its message content. In FIGS. 4A and 4B, the message content 230d (FIG. 4A) is an example of a message that has been transmitted by another user based on the information about a value of the message 200d (FIG. 4A) and content of its message is described in a form of a text file. The message content 230e (FIG. 4B) is an example of spot information transmitted from the center 100 based on information about a value of the message type 200e (FIG. 4B) and the content of its message is described in a form of a tagged text file.

Referring to FIG. 1, as described above, the center 100 includes the message controlling unit 101, the user TPO element information extracting unit 102, the occasion learning unit 103, the spot information database 104, the user TPO database 105 and the TPO matching unit 106. The message controlling unit 101 manages a message and transmits the message to and receives the message from the portable information terminal 150. As shown in FIG. 1 and FIGS. 3A, 3B, and 3C, the message controlling unit 101, when receiving a message from the portable information terminal 150, if the received message is the place information as in the case of the message type 200a (FIG. 3A), transfers the message to the user TPO element information extracting unit 102. The message controlling unit 101, when receiving a message from the portable information terminal 150, if the received message is the message to be transmitted to another user as in the case of the message type 200b (FIG. 3B) or is the message requesting for spot information as in a case of the message type 200c (FIG. 3C), transfers the message to both the user TPO element information extracting unit 102 and the TPO matching unit 106. If the message is a message to be used for the registration of the user, the message controlling unit 101 performs processing of the registration of the user. The message controlling unit 101, if the message received from the TPO matching unit 106 is the message transmitted from the center 100 to the user as in the case of the message type 200d (FIG. 4A), transmits the message to the portable information terminal 150. The message controlling unit 101, if the received message is spot information to be transmitted to the user as in the case of the message type 200e (FIG. 4B), transfers the message to the user TPO element information extracting unit 102 and transmits the message to the portable information terminal 150 at the same time.

The user TPO element information extracting unit 102, when receiving the message from the message controlling unit 101, extracts, from the received message, element information including information about a present time (T), a present place (P), and a present occasion (O) of the user carrying the portable information terminal 150 having transmitted the message. The time when the message controlling unit 101 has received the message is extracted as the present time (T) of the user.

If the portable information terminal 150 and the center 100 are placed in areas where a time-zone difference occurs, a time-zone can be identified based on the place described in the place information 220 included in the message.

Place information is extracted using the place information 220 contained in the message as shown in FIG. 2.

The element information about the desired occasion is obtained by combining the message content 230 extracted at a word level with the time and place which have been already extracted as attributes of the user.

The spot information database 104 included in the center 100 is a database storing spot information about a restaurant, sight-seeing resort, or a like made up of information about places of the spot and explanatory contents of the spot.

As shown in FIG. 5, spot information stored in the spot information database 104 is made up of a spot ID 300, a spot name 310, place information 320, and a content of description 330. The spot ID 300 describes a value that identifies spot information uniquely. As in the case of the spot ID 300 (300a) shown in FIG. 6A, the spot ID, if it is not an advertisement, is described, for example, by combining a code of "G" with a numeral. As in the case of a spot ID 300b shown in FIG. 6B, the spot ID, if it is an advertisement, is described, for example, by combining a code of "C" with a numeral.

In FIG. 5, the spot name 310 describes a name of spot information. The place information 320 describes place information of the spot.

In FIGS. 6A and 6B, place information 320a and 320b, for example, are described by using the latitude and longitude. The description content 330 describes its content by a string of characters, image, voice, moving picture, or a like. In FIGS. 6A and 6B, for example, the description contents 330a and 330b describe contents of the spot by a string of characters.

The user TPO database 105 is made up of "static information" (that is, the information is invariant or unchanged for a predetermined period of time or more) including a user ID, age, gender, or a like and "dynamic" information (that is, the information dynamically changes) about when and where a user has visited or about what kinds of spots or information the user has an interest in. In FIG. 7, for example, user TPO data stored in the user TPO database 105 is made up of a user ID 400, place information 410, profile information 420, operational information 430 and movement information 440. The user ID 400 describes a value which is used to identify a user uniquely. The user ID 400 is the same as the user ID 210 contained in the message in FIG. 2.

The place information 410 describes a present place where a portable information terminal 150 identified by the user ID 400 exists. The place information 410 is the same as the place information 220 contained in the message in FIG. 2.

Figure 8:
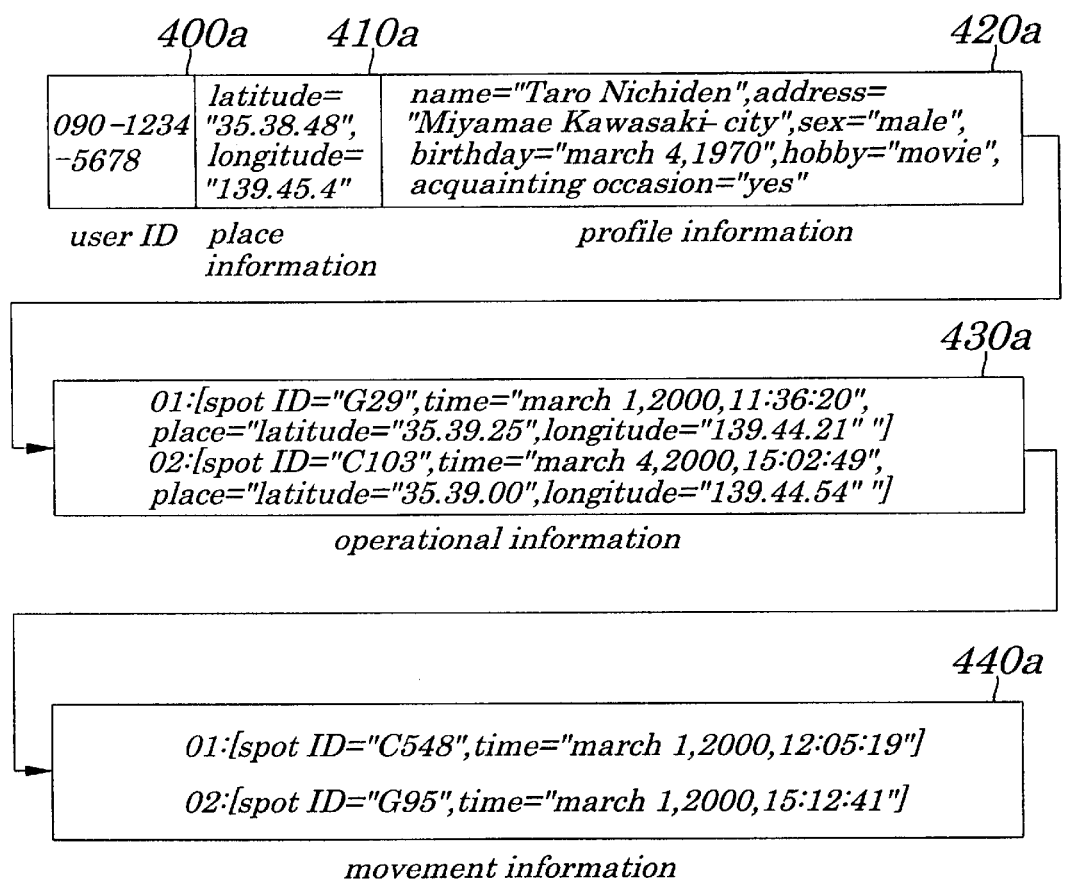
FIG. 8 is a diagram showing an example of the user TPO data employed in the communication system according to the embodiment of the present invention.

The profile information describes static information including the age, the gender, or a like of the user. As shown in FIG. 8, for example, the profile information 420a is made up of a name of the user, an address, a gender, birthday, keywords of information in which the user has an interest, and setting of an occasion desire.

The operational information 430 describes dynamic information about what kind of information the user has required of the center 100. In FIG. 8, for example, the operational information 430a describes a spot ID of spot information required by the user, the time when the user made a request for the spot information, and the place where a request for the information is made.

The movement information 440 describes dynamic information about what kind of spot the user has visited. In FIG. 8, for example, the movement information 440a describes a spot ID of spot information about a spot where the user has visited and the time when the user visited the spot.

The occasion learning unit 103 learns a desired occasion of the user by referring to information about a time and place of the user and element information about the desired occasion of the user extracted by the user TPO element information extracting unit 102 and to the spot information database 104 and outputs the result to the user TPO database 105. In FIG. 8, for example, the occasion learning unit 103, when a request for spot information is made by the user, outputs a spot ID of the spot information selected by the TPO matching unit 106 and time and place when and where the user made the request for the spot information, to an address of the operational information 430a contained in the user TPO database 105. Moreover, the occasion learning unit 103, when information about a place only is transmitted from the user, regards a place where the user has stayed for a predetermined period of time or more as a place where the user has visited and retrieves spot information suitable to the user from the spot information database 104 and then outputs a spot ID 300 of the matching spot information and the time when the user started to stay, to an address of the movement information 44a0 contained in the user TPO database 105.

The TPO matching unit 106, when receiving a request from the message controlling unit 101, outputs, by achieving a match among the user TPO data contained in the user TPO database 105 and between the user TPO data and spot information stored in the spot information database 104, the information about another user having best matching conditions in terms of time, place, and occasion of the user having transmitted the request message or spot information having best matching conditions in terms of time, place, and occasion of the user having transmitted the request message. For example, the TPO matching unit 106, when receiving a message from a user requesting for spot information, by achieving a match between the user TPO data on the user having transmitted the request message contained in the user TPO database 105 and spot information contained in the spot information database 104, outputs spot information having best matching conditions in terms of time, place, and desired occasion of the user. Moreover, the TPO matching unit 106, when receiving a message requesting for transmission of a message to another user, by achieving a match between the user TPO data of the user having transmitted the request message contained in the user TPO database 105 and a user TPO data of other user, outputs the information about the other user having best matching conditions in terms of time, place, and desired occasion. The TPO matching unit 106 may handle the user TPO data only on members, instead of all the user TPO data. The TPO matching unit 106 can judge whether a user is a member or not, for example, by referring to setting of "acquainting occasion matching desire" described in the profile information contained in the user TPO data. Moreover, the TPO matching unit 106, when receiving the request for spot information or the request for transmission of the message to another user, may add advertisement information having best matching conditions in terms of time, place, and desired occasion of the user having transmitted the request message and having been selected by achieving the match among the user TPO data or between the user TPO data and the spot information stored in the spot information database 104, to the spot information to be transmitted to the user having transmitted the request message or to the message to be transmitted to another user.

The portable information terminal 150 and the center 100 are communicated via the wireless communication unit 180. A portable cellular phone or a PHS (Personal Handyphone System) may be used as the wireless communication unit 180.

Next, operations of the communication system including the portable information terminal 150 and the center 100 of the embodiment will be described by referring to FIG. 9. First, operations of the portable information terminal 150 will be described.

The portable information terminal 150 checks whether it has received a message from the center 100 (Step S100). When the portable information terminal 150 has received the message, the message is provided to a user (Step S101) and a routine proceeds to Step S102. If the portable information terminal 150 has not received any message, a place where the portable information terminal 150 exists is obtained (Step S102). The portable information terminal 150 accepts operations of the user in response to the received message (Step S103). A message made up of processing at Step S102 and Step S103 is produced and is transmitted to the center 100 (Step S104).

Here, processing at Step S104 will be described in detail by referring to FIG. 2. At Step S104, the place information obtained at Step S102 is described in the place information 220 in the message. A user ID of the user of the portable information terminal 150 is described as the user ID 210.

If any operation of a user is not accepted at Step S103, since the place information only is transmitted as a message to the center 100, the transmission of the place information 220 is described as the message type 200. When, at Step S103, operation of the user is accepted and when operation of the user includes a request for transmission of a message to another user, the transmission of the user message is described in the message type 200 and contents of the message to be transmitted to the other user is described as the message content 230. When operation of the user is a request for spot information, the request for the spot information is described in the message type 200. The message thus created is transmitted to the center 100.

Operations of the center 100 will be described by referring to FIG. 9. The center 100 checks whether it has received the message from the portable information terminal 150 (Step S200). If the message has not been received, the routine returns back to Step S200. When the message has been received, whether the message requires TPO matching or not is checked (Step S201). When the message requires no TPO matching, whether the message is a message for user registration or not is determined (Step S208). If it is the message for user registration, registration is performed (Step S209) and the routine returns back to Step S200.

Element information (user TPO element information) including information about a present time (T), a present place (P) and a present occasion (O) of the user is extracted from the message transmitted from the user (Step S202) and the desired occasion of the user is learned from the user TPO element information (Step S203) and the routine returns to Step S200.

If the message requires the TPO matching, the TPO matching is performed (Step S204) and the result from Step S204 is created as a message from which the user TPO element information is extracted (Step S205). Based on the TPO element information, the desired occasion of the user is extracted (Step S206) and is transmitted to the portable information terminal 150 (Step S207) and the routine returns to Step S200.

By referring to FIG. 2, processing at Step S201 will be described in detail. At Step S201, whether the message requires the TPO matching is checked by identifying the message type 200 of the message received at Step S200.

If the message type 200 is a message for transmission of the place information, since a place where the portable information terminal 150 of the user exists is merely notified, the TPO matching is not required. If the message type 200 is a message for transmission of the message to another user or for a request for spot information, since the match is necessary among the user TPO data and between the user TPO data and the spot information, the TPO matching is required.

Next, processing at Step S202 and S205 will be explained by referring to FIG. 2. At Step S202, when a message is received at Step S200, the time of receiving the message is extracted as the present time of the user. If the portable information terminal 150 and the center 100 are placed in areas where a time-zone difference occurs, by identifying the time-zone based on the place described in the place information 220, the processing is performed.

To obtain information about the place, the place information 220 is extracted. By combining the message content 230 extracted at a word level with the time and place already extracted as attributes of the user, the desired occasion can be acquired.

Processing at Step S203 will be explained in detail by referring to FIGS. 2, 5, and 7. For example, at Step S203, since the user TPO element information extracted from the message containing only the place information 220 transmitted has been received, if the user stayed within an area for a predetermined period of time or more, the spot in the vicinity of the area is regarded as the spot where the user has visited. Then, by retrieving the above corresponding spot information from the spot information database 104, the spot ID 300 and the time where the user had started to stay are described in the movement information 440 contained in the user TPO data of the user having the user ID 400.

Processing at Step S206 will be explained in detail by referring to FIGS. 3, 5, and 7. For example, at Step S206, since the user TPO element information extracted from the message requesting transmission of the message to another user and from the message requesting for the spot information has been received, in the case of the message requesting the spot information, the spot ID of the corresponding spot information from the message content 230 and the spot ID, time, and place are described in the operational information 430 of the user TPO data having the user ID 400.

Processing at Step S204 will be explained in detail by referring to FIGS. 2, 5, and 7. For example, at Step S204, when the accepted message whose message type 200 is the one requesting for the spot information, the match is achieved between the user TPO data having the same user ID 400 as the user ID 210 of the user transmitted the message contained in the user TPO database 105 and the spot information contained in the spot information database 104, and the spot information that can match with the user having transmitted the request message in terms of time, place, and desired occasion. Specifically, the matched spot information is selected based on the evaluation from comparison of the place information 410 of the user TPO data, place information of the spot information, profile information 420 of the user TPO data, operational information 430, movement information 440, spot name 310 of the spot information, and description content 330.

Moreover, at Step S204, when the accepted message whose message type 200 being the one for transmission of the user message, that is, the message requesting the transmission of a message to another user is received, a match between the user TPO data having the same user ID 400 as the user ID 210 of the user having transmitted the message contained in the user TPO database 105 and the user TPO data of the other user is achieved and the matched user information in terms of time, place, and desired occasion is selected and output. Specifically, the matched user information is selected based on the evaluation from comparison of the place information 410 of the user TPO data, profile information 420, and movement information 440.

Furthermore, at Step S204, by selecting only the user who has described the desire for acquainting occasion in the profile information 420 of the user TPO data, occasion matching service to be provided only to a member is implemented. Moreover, at Step S204, as described above, the center 100, when receiving a message requesting for spot information and a message requesting for the transmission of a message to the other user, may add advertisement information that can match with the user in terms of time, place, and desired occasion obtained through the matching of the information, to the spot information and to the message to the other user.

It is apparent that the present invention is not limited to the above embodiments but may be changed and modified without departing from the scope and spirit of the invention.

What is claimed is:

1. A communication system for mobile device users comprising:
    a portable information terminal;
    a center; and
    wherein said portable information terminal and said center are communicated with each other through a wireless communication unit; and
    wherein said portable information terminal has:
        a place information managing unit used to acquire information about a place where said portable information terminal exists and to manage the acquired place information; and
        a message managing unit used to manage said acquired place information, an identification to identify a user and an operational behavior of said user in a form of a message and to transmit said message to said center and used to provide a message fed from said center to said user;
    wherein said center has:
        a message controlling unit used to transmit said message to said portable information terminal and to receive said message from said portable information terminal;
        a user TPO element information extracting unit used to extract element information made up of information about a present time (T), a present place (P), and an individual preference according to a present Occasion (O) of said user from a message fed from said portable information terminal;
        a spot information database used to store spot information about a restaurant and/or a sight-seeing resort made up of information about spots and explanatory contents of said spots;
        an occasion learning unit used to learn a desired individual preference according to an occasion from said user TPO element information and said spot information database and to produce user TPO data made up of static information containing an identification, age, sex of said user, and of dynamic information about when and where said user has visited and about what kind of spot or information said user has an interest in;
        a user TPO database used to store said user TPO data produced for each user by said occasion learning unit; and
        a TPO matching unit used to select spot information, when said message fed from said user includes a request for spot information, by achieving a match between spot information and said user TPO data of said user having transmitted the request message contained in said user TPO database and to request said message controlling unit to transmit said selected spot information to said portable information terminal of said user having transmitted said message requesting spot information and, when said message fed from said user includes a request for transmission of a message from said user to another user, to select said other user by achieving a match between said user TPO data of said user having transmitted said message requesting for transmission of said message to said other user contained in said user TPO database and user TPO database of said other user and to request said message controlling unit to transmit said message fed from said user to a portable information terminal of said other user.

2. The communication system for mobile device users according to claim 1, wherein said message controlling unit in said center judges whether said user having transmitted a message to said center is a user who has been registered with said user TPO database from a user identification contained in said message fed from said portable information terminal and, as a result, if said user is not the registered user, controls said user TPO element information extracting unit so as not to perform extracting processes, said occasion learning unit so as not to perform learning processes and said TPO matching unit so as not to perform matching processes.

3. The communication system for mobile device users according to claim 1, wherein said spot information database stores advertisement information to be added to said spot information.

4. The communication system for mobile device users according to claim 1, wherein said TPO matching unit adds advertisement information selected by achieving a match between user TPO data of said selected other user and said advertisement information contained in said spot information database, to said selected spot information or to a message to be transmitted to said selected other user.

5. The communication system for mobile device users according to claim 1, wherein a portable cellular phone or personal handy phone system is used as said wireless communication unit.

6. The communication system for mobile device users according to claim 1, wherein said message transmitted and received between said portable information terminal and said center is an electronic mail.

7. A communication method for mobile device users comprising:
    a step of acquiring information about a place where a portable information terminal exists and of managing the place information in said portable information terminal;
    a step of managing said place information, an identification to identify the user of said portable information terminal and an operational behavior of said user in a form of a message and transmitting said message from said portable information terminal to a center by a wireless communication unit and receiving said message fed from said center through said wireless communication unit and providing said message to said user, in said portable information terminal;

a step of managing a message to be transmitted and received between said portable information terminal and said center and of transmitting and receiving said message to and from said portable information terminal through said wireless communication unit, in said center;

a step of extracting a user TPO element information made up of information about a present time (T), a present place (P), and an individual preference according to a present Occasion (O) of said user from a message fed to said center from said portable information terminal through said wireless communication unit, in said center;

a step of learning a desired individual preference according to an occasion of said user based on said user TPO element information and a spot information database storing spot information about a restaurant and/or a sight-seeing resort made up of information about spots and explanatory contents of said spots and producing user TPO data made up of static information containing said identification, age, sex of a user and of dynamic information about when and where said user has visited and about what kind of spot or information said user has an interest in, in said center;

a step of selecting said spot information, when said message fed from said user contains a request for said spot information, by achieving a match between said spot information and said user TPO data of said user having transmitted said message contained in said user TPO database and requesting to transmit said selected spot information to said portable information terminal of said user having transmitted said message requesting for said spot information and, when said message fed from said user contains a request for transmission of a message from said user to another user, selecting said other user by achieving a match between said user TPO data on said user having transmitted said message requesting for transmission of said message to the selected other user contained in said user TPO database and user TPO database of said selected other user and requesting to transmit said message fed from said user to a portable information terminal of said selected other user, in said center.

8. The communication method for mobile device users according to claim 7, wherein said center judges whether said user having transmitted a message is a user who has been registered with said user TPO database, from a user identification contained in said message fed from said portable information terminal and, as a result, if said user is not a registered user, does not perform said step of extracting said user TPO element information, said step of learning a desired individual preference according to an occasion of said user and of storing said user TPO data for each user into said user TPO database and said step of achieving a match among said user TPO data.

9. The communication method for mobile device users according to claim 7, wherein said spot information database contains advertisement information to be added to said spot information.

10. The communication method for mobile device users according to claim 7, wherein, in said step, taken by said center, of identifying a user based on said user identification of said message fed from said portable information terminal through said wireless communication unit and of achieving a match between said user TPO data and said spot information database or said user TPO database, advertisement information selected by achieving a match between user TPO data of said selected other user and advertisement information contained in said spot information database is added to said selected spot information or to a message to be transmitted to said selected other user.

11. The communication method for mobile device users according to claim 7, wherein a portable cellular phone or personal handy phone system is used as said wireless communication unit.

12. The communication method for mobile device users, according to claim 7, wherein said message transmitted and received between said portable information terminal and said center is an Electronic mail.

13. A communication business method comprising:

a step of holding and managing, in a center communicating with a portable information terminal by a wireless communication unit, a spot information database used to store spot information about a restaurant and/or a sight-seeing resort made up of information about spots and explanatory contents of said spots and a user TPO database storing, for each user, user TPO data including information about a time (T), a place (P), and an individual preference according to an occasion (O) of said user:

a step of extracting a user TPO element information made up of information about said time (T), said place (P), and said individual preference according to said occasion (O) of said user from a message transmitted from a portable information terminal of said user and received by said center and obtaining said user TPO data containing a present place, and/or a desired individual preference according to a present occasion of said user and automatically updating said user TPO database; and a step of retrieving said spot information from said spot information database, when said message received by said center contains a request for said spot information, and obtaining spot information having best matching conditions in terms of time (T), place (P), and individual preference according to occasion (O) of said user and providing said obtained spot information to said portable information terminal of said user, wherein said user TPO database holds, for each said user, said identification of said user, profile information made up of information about personal information of said user, place information of said user, operational information of said user, and information about movement of said user, said profile information of said user comprising personal information about a name, an address, a gender and an age, information about key words indicating information in which said user has an interest and information about a presence or absence of a desire for acquainting an individual preference according to an occasion, said operational information of users comprising a spot identification of spot information requested by said user, a time when a request for said spot information was made and a place where a request for said spot information was made, and said movement information of users comprising a spot identification of spot information related to spots where said user has visited and a time of said visit.

14. The communication business method according to claim 13, further comprising a step of extracting said user TPO element information made up of said time (T), said place (P), and said individual preference according to said occasion (O) of said user, when a request for transmission of a message from said user to another user is contained in a message transmitted from said portable information terminal of said user and received by said center from said received message and obtaining said user TPO data made up of information about a present place, and/or an individual preference according to an present occasion of said user from said extracted said user TPO element information and selecting said other user having best matching conditions in terms of said time (T), said place (P), and said individual preference according to said occasion (O) of said user by retrieving information from said user TPO database and then transmitting message information fed from said user to a portable information terminal of said other user.

15. The communication business method according to claim 13, wherein said spot information is made up of guidance information including, at least, one of a character string, image, voice, and moving picture.

16. The communication business method according to claim 13, wherein advertisement information is added to said spot information and/or message information to be transmitted from said center to said portable information terminal.

17. The communication business method according to claim 16, wherein advertisement information having best matching conditions in terms of time (T), place (P), and individual preference according to occasion (O) of users going to receive said spot information and/or message information.

18. The communication business method according to claim 13, wherein place information of said portable information terminal is transmitted from said portable information terminal to said center and contents of said user TPO database are automatically updated based on said message transmitted from said portable information terminal.

19. A communication business method comprising:
a step of holding and managing, in a center communicating with a portable information terminal by a wireless communication unit, a user TPO database storing, for each user, user TPO data including information about a time (T), a place (P), and an individual preference according to an occasion (O) of said user;
a step of extracting a user TPO element information made up of information about said time (T), said place (P), and said individual preference according to said occasion (O) of said user from a message transmitted from a portable information terminal of said user and received by said center and obtaining said user TPO data containing a present place, and/or a desired individual preference according to a present occasion of said user and automatically updating said user TPO database;
a step of setting a presence or an absence of a desire for acquainting an individual preference according to an occasion, as a profile of said user, in said user TPO database; and
a step of retrieving said user TPO database, when said message received by said center contains a request for transmission of a message to another user or a request for acquainting an individual preference according to an occasion matching and selecting said other user having best matching conditions in terms of said time (T), and place (P), and said individual preference according to said occasion (O) of said user and providing said message transmitted from said user to a portable information terminal of said other user, wherein said user TPO database hold, for each said user, said identification of said user, profile information made up of information about personal information of said user, place information of said user, operational information of said user, and information about movement of said user, said profile information of said user comprising personal information about a name, an address, a gender and an age, information about key words indicating information in which said user has an interest and information about said presence or absence of said desire for acquainting an individual preference according to an occasion, said operational information of users comprising a spot identification of spot information requested by said user, a time when a request for said spot information was made and a place where a request for said spot information was made, and said movement information of users comprising a spot identification of spot information related to spots where said user has visited and a time of said visit.

20. The communication business method according to claim 19, wherein said other user having best matching conditions in terms of said time (T), said place (P), and said individual preference according to said occasion (O) of said user having transmitted said request for transmission of said message is selected out of other users for whom a desire for acquainting an individual preference according to an occasion has been pre-set in said user profile information contained in said user TPO database.

21. The communication business method according to claim 19, wherein advertisement information is added to said spot information and/or message information to be transmitted from said center to said portable information terminal.

22. The communication business method according to claim 21, wherein advertisement information having best matching conditions in terms of time (T), place (P), and individual preference according to occasion (O) of users going to receive said spot information and/or message information.

23. The communication business method according to claim 19, wherein place information of said portable information terminal is transmitted from said portable information terminal to said center and contents of said user TPO database are automatically updated based on said message transmitted from said portable information terminal.

24. A communication business method comprising:
a step of holding and managing, in a center communicating with a portable information terminal by a wireless communication unit, a spot information database used to store spot information about a restaurant and/or a sight-seeing resort made up of information about spots and explanatory contents of said spots and a user TPO database storing, for each user, user TPO data including information about a time (T), a place (P), and an individual preference according to an occasion (O) of said user;
a step of extracting a user TPO element information made up of information about said time (T), said place (P), and said individual preference according to said occasion (O) of said user from a message transmitted from a portable information terminal of said user and received by said center and obtaining said user TPO data containing a present place, and/or a desired individual preference according to a present occasion of said user and automatically updating said user TPO database; and
a step of retrieving said spot information from said spot information database, when said message received by said center contains a request for said spot information, and obtaining spot information having best matching conditions in terms of time (T), place (P), and individual preference according to occasion (O) of said user and providing said obtained spot information to said portable information terminal of said user, wherein said user TPO database holds, for each said user, said identification of said user, profile information made up of information about personal information of said user, place information of said user, operational information of said user, and information about movement of said user, and wherein, when place information is transmitted from said portable information terminal of said user and when said user stays for a predetermined period of time or more within a spot area, it is judged that said user has visited said spot and spot information for said user is retrieved from said spot information database and, based on information about said spot in which said user is judged to have visited, said movement information of said user TPO database is updated.

25. A communication business method comprising:

a step of holding and managing, in a center communicating with a portable information terminal by a wireless communication unit, a user TPO database storing for each user, user TPO data including information about a time (T), a place (P), and an individual preference according to an occasion (O) of s aid user;

a step of extracting a user TPO element information made up of information about said time (T), and place (P), and said individual preference according to said occasion (O) of said user from a message transmitted from a portable information terminal of said user and received by said center and obtaining said user TPO data containing a present place, and/or a desired individual preference according to a present occasion of said user and automatically updating said user TPO database;

a step of setting a presence or an absence of a desire for acquainting an individual preference according to a occasion, as a profile of said user, in said user TPO database; and a step of retrieving said user TPO database, when said message received by said center contains a request for transmission of a message to another user or a request for acquainting an individual preference according to an occasion matching and selecting said other user having best matching conditions in terms of said time (T), said place (P), and said individual preference according to said occasion (O) of said user and providing said message transmitted from said user to a portable information terminal of said other user, wherein said user TPO database holds, for each said user, said identification of said user, profile information made up of information about personal information of said user place information of said user, operational information of said user, and information about movement of said user, and wherein, when place information is transmitted from said portable information terminal of said user and when said user stays for a predetermined period of time or more within a spot area, it is judged that said user has visited said spot and spot information for said user is retrieved from said spot information database and, based on information about said spot in which said user is judged to have visited, said movement information of said user TPO database is updated.

26. A communication business center apparatus for mobile device users being communicated with a portable information terminal via a wireless communication unit comprising:

a spot information database used to store spot information about a restaurant and/or a sight-seeing resort made up of information about spots and explanatory contents of said spots;

a user TPO database used to store said user TPO data produced for each user including information about a time (T), a place (P), and an individual preference according to an occasion (O) of said user;

an extracting unit used to extract a user TPO element information made up of information about a present time (T), a present place (P), and an individual preference according to a present occasion (O) of said user from a message fed from said portable information terminal:

an automatically updating unit used to obtain user TPO data made up of information about a present place, and an individual preference according to a present occasion of said user from said extracted said user TPO element information and automatically updates said user TPO database;

a spot information obtaining unit used to obtain, when said received message contains a request for spot information, by retrieving said spot information database, spot information having best matching conditions in terms of time (T), place (P), and individual preference according to occasion (O) of said user and to supply said spot information to a portable information terminal of said user, wherein said user TPO database holds, for each said user, said identification of said user, profile information made up of information about personal information of said user, place information of said user, operational information of said user, and information about movement of said user, said profile information of said user comprising personal information about a name, an address, a gender and an age, information about key words indicating information in which said user has an interest and information about a presence or absence of a desire for acquainting an individual preference according to an occasion, said operational information of users comprising a spot identification of spot information requested by said user, a time when a request for said spot information was made and a place where a request for said spot information was made, and said movement information of users comprising a spot identification of spot information related to spots where said user has visited and a time of said visit.

27. The communication business center apparatus according to claim 26, further comprising:

a selecting unit used to select another user having best matching conditions in terms of time (T), place (P), and individual preference according to occasion (O) of a user having transmitted a message from a portable information terminal of said user containing a request for transmission of a message to said other user or a request for acquainting an individual preference according to an occasion by retrieving related information from said user TPO database and to transmit message information fed from said user to a portable information terminal of said other user.

28. The communication business center apparatus for mobile device users according to claim 26, wherein said spot information is made up of guidance information including, at least, one of a character string, image, voice and moving picture.

29. The communication business center apparatus for mobile device users according to claim 26, wherein advertisement information is added to spot information and/or message information to be transmitted from said center to said portable information terminal.

30. The communication business center apparatus for mobile device users according to claim 29, wherein advertisement information having best matching conditions in terms of time (T), place (P), and individual preference according to occasion (O) of users going to receive said spot information and/or message information is sent.

31. The communication business center apparatus for mobile device users according to claim 26, wherein place information of said portable information terminal is transmitted from said portable information terminal to said center and contents of said user TPO database are automatically updated based on said message transmitted from said portable information terminal.

32. A communication program which causes processing to be performed by computers making up a center being communicated with a portable information terminal through a wireless communication unit,
    wherein said portable information terminal includes:
        a place information managing unit used to acquire information about a place where said portable information terminal exists and to manage the acquired place information; and
        a message managing unit used to manage said place information, an identification to identify a user and an operational behavior of said user in a form of a message and to transmit said message to said center and used to provide a message fed from said center to said user; and
    wherein said center has:
        a spot information database used to store spot information about a restaurant and/or a sight-seeing resort made up of information about spots and explanatory contents of said spots;
        a user TPO database used to store user TPO data made up of information about time (T), place (P), and individual preference according to occasion (O) produced for each user; and
    wherein said processing includes:
        (a) a step of managing a message to be transmitted and received between said portable information terminal;
        (b) a step of extracting a user TPO element information made up of information about a present time (T), a present place (T), and an individual preference according to an present occasion (O) of a user from a message fed to said center from said portable information terminal;
        (c) a step of learning a desired individual preference according to an occasion of said user based on said user TPO element information and said spot information database storing said spot information about said restaurant and/or said sight-seeing resort made up of information about said spots and explanatory contents of said spots and producing said user TPO data made up of static information containing said identification, an age and a gender of said user and of dynamic information about when and where said user has visited and about what kind of spot or information said user has an interest in;
        (d) a step of selecting spot information, when said message fed from said user contains a request for spot information, by achieving a match between spot information and said user TPO data of said user having transmitted said message contained in said user TPO database and requesting that said selected spot information is transmitted by said message managing step to a portable information terminal of said user having transmitted said message requesting for said spot information and, when said message fed from said user contains a request for transmission of a message from said user to another user, selecting said other user by achieving a match between said user TPO data on said user having transmitted said message requesting for transmission of said message to said other user contained in said user TPO database and user TPO database of said other user and requesting that said message fed from said user is transmitted by said message managing step to a portable information terminal of said other user.

33. A storage medium storing a communication program which causes processing to be performed by computers making up a center being communicated with a portable information terminal through a wireless communication unit,
    wherein said portable information terminal includes:
        a place information managing unit used to acquire information about a place where said portable information terminal exists and to manage the acquired place information; and
        a message managing unit used to manage said place information, an identification to identify a user and an operational behavior of said user in a form of a message and to transmit said message to said center and used to provide a message fed from said center to said user; and
    wherein said center has:
        a spot information database used to store spot information about a restaurant and/or a sight-seeing resort made up of information about spots and explanatory contents of said spots;
        a user TPO database used to store user TPO data made up of information about time (T), place (P), and individual preference according to occasion (O) produced for each user; and
    wherein said processing includes:
        (a) a step of managing a message to be transmitted and received between said portable information terminal;
        (b) a step of extracting a user TPO element information made up of information about a present time (T), a present place (T), and an individual preference according to an present occasion (O) of a user from a message fed to said center from said portable information terminal;
        (c) a step of learning a desired individual preference according to an occasion of said user based on said user TPO element information and said spot information database storing said spot information about said restaurant and/or said sight-seeing resort made up of information about said spots and explanatory contents of said spots and producing said user TPO data made up of static information containing said identification, an age and a gender of said user and of dynamic information about when and where said user has visited and about what kind of spot or information said user has an interest in;

(d) a step of selecting spot information, when said message fed from said user contains a request for spot information, by achieving a match between spot information and said user TPO data of said user having transmitted said message contained in said user TPO database and requesting that said selected spot information is transmitted by said message managing step to a portable information terminal of said user having transmitted said message requesting for said spot information and, when said message fed from said user contains a request for transmission of a message from said user to another user, selecting said other user by achieving a match between said user TPO data on said user having transmitted said message requesting for transmission of said message to said other user contained in said user TPO database and user TPO database of said other user and requesting that said message fed from said user is transmitted by said message managing step to a portable information terminal of said other user.

* * * * *